Figure 1:
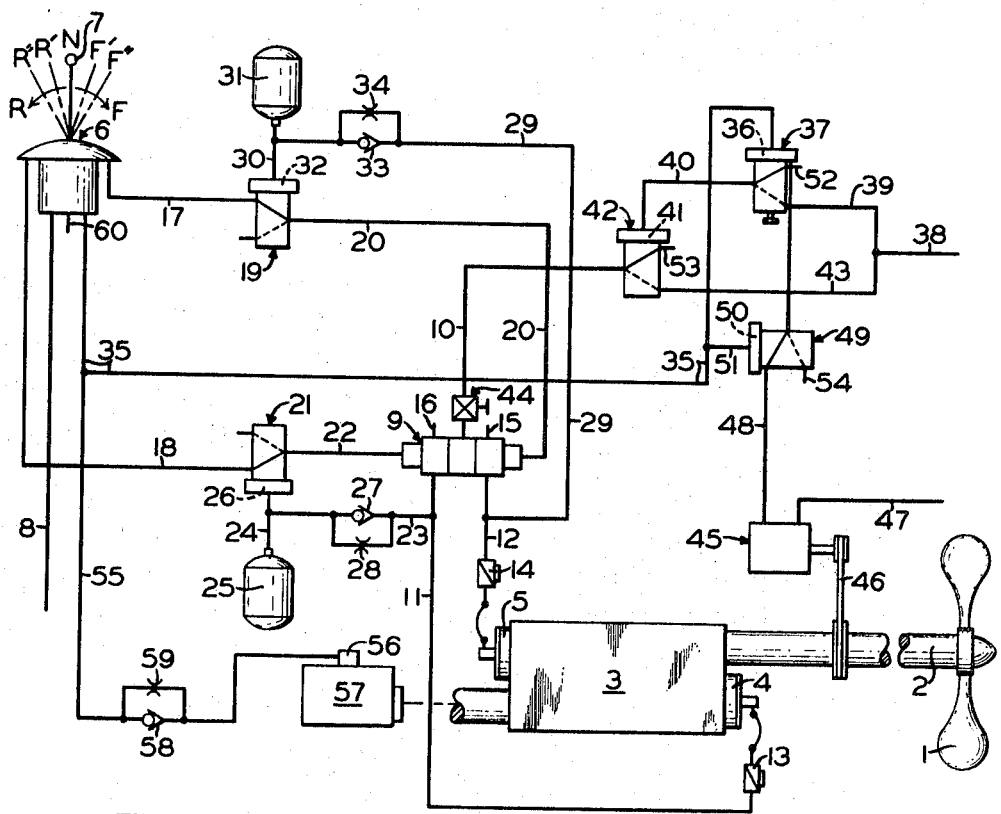

United States Patent
Allen et al.

[15] 3,653,476
[45] Apr. 4, 1972

[54] SLIP CONTROL SYSTEMS FOR AIR CLUTCHES

[72] Inventors: Clifford W. Allen; Richard F. Wilson, both of Lexington, Ky.

[73] Assignee: Westinghouse Air Brake Company, Wilmerding, Pa.

[22] Filed: July 29, 1970

[21] Appl. No.: 59,103

[52] U.S. Cl............................192/104 F, 192/87.19
[51] Int. Cl....................F16d 43/24, F16d 25/12
[58] Field of Search..........192/87.19, 103 F, 103 FA, 104 F, 192/105 F, 0.033, 0.076

[56] References Cited

UNITED STATES PATENTS

| | | | |
|---|---|---|---|
| 3,548,987 | 12/1970 | Erickson et al. | 192/104 F |
| 3,184,024 | 5/1965 | Aschauer | 192/103 F |
| 3,324,983 | 6/1967 | Snoy et al. | 192/104 F X |
| 3,469,663 | 9/1969 | Hilpert et al. | 192/104 F X |
| 3,563,355 | 2/1971 | Goodson et al. | 192/104 F |

*Primary Examiner*—Allan D. Herrmann
*Attorney*—Ralph W. McIntire, Jr.

[57] ABSTRACT

Apparatus for automatically modulating the operating pressure supplied to a slip clutch control mechanism driving a ship propeller, whereby the speed of the propeller is maintained constant in accordance with the preselected degree of such operating pressure established by the operator's setting of the controller, particularly during low speed operations.

10 Claims, 2 Drawing Figures

Patented April 4, 1972

3,653,476

INVENTOR.
CLIFFORD W. ALLEN
BY RICHARD F. WILSON

Ralph W. McIntire, Jr.
ATTORNEY

SLIP CONTROL SYSTEMS FOR AIR CLUTCHES

BACKGROUND OF THE INVENTION

Under certain conditions, such as during maneuvering operations of a tug boat, for example, in assisting a large vessel in docking, it is desirable to maintain constant speed of the tug boat propeller during such maneuvering so that a steady pushing force is maintained against the large vessel but at a low engine speed to permit closer, more accurate control of the maneuvering operation.

On some tug boats equipped with air operated clutches, the clutch control apparatus operates in such manner that the clutch is either completely engaged or completely disengaged so that, when engaged, the propeller is normally driven at a speed corresponding to the setting of the engine throttle as selected on the controller by the operator. Should the tug boat, however, in maneuvering to dock a vessel, encounter various degrees of resistance to the force exerted thereby on the vessel, the engine speed and, therefore, the working force output of the propeller is affected accordingly, thereby perhaps necessitating readjustment of the controller by the operator to either increase or decrease engine speed to compensate for the variations caused by the various degrees of resistance. The necessity of having to take time to adjust engine and propeller speed, sometimes quite frequently, by the tug boat operator, renders the maneuvering operation less efficient in that it is more time consuming and perhaps tedious when such adjustments are required frequently and are of a small degree.

SUMMARY OF THE INVENTION

The object of the present invention, therefore, is to provide a control system for air clutches which automatically compensates for variations in work force output required by the engine and propeller and automatically maintains the propeller at constant speed corresponding to the preselected setting of the controller by the operator.

The object of the invention is attained by apparatus comprising the usual operator's controller device, which is selectively operable for establishing a fluid pressure control impulse and consequent supply of actuating fluid pressure to effect, in the lower pressure ranges of said control impulse, partial engagement of either the ahead or astern clutch and to establish engine and propeller speed in accordance with the degree of said control pressure impulse determined by the setting of the controller by the operator, a speed sensing device for detecting any variations in preselected propeller speed and for transmitting a fluid pressure signal accordingly, analog interface valve means responsive cooperatively to said control pressure impulse and to said fluid pressure signal for effecting either a reduction of air clutch pressure (if propeller speed has increased) for causing clutch slippage to an extent necessary for reducing propeller speed to the preselected speed, or an increase in clutch pressure (if propeller speed has decreased) for causing tighter engagement of the clutch to increase propeller speed to the preselected speed, and means operable responsively to such a control pressure impulse at a pressure exceeding a certain value for intercepting and rendering said fluid pressure signal ineffective in consequence of which, the degree of resulting actuating pressure supplied to the clutch is effective for causing full engagement of said clutch. The slip clutch control apparatus above described may be further characterized by means for cutting out slip control of the astern clutch, so that slip clutch control is provided for ahead operations only.

Figure 2:
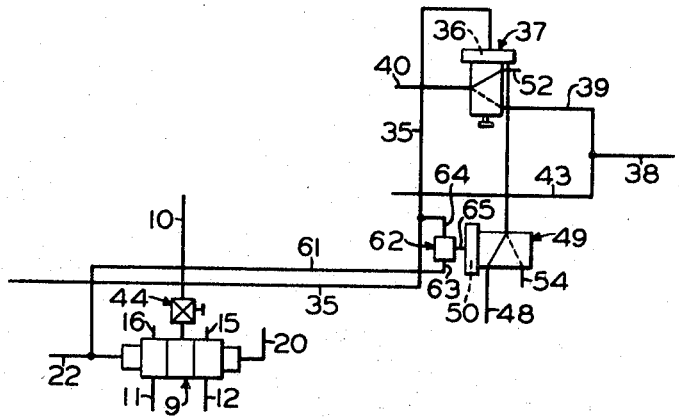

In the drawings,

FIG. 1 is a schematic view of a slip control system for both ahead and astern air clutches; and FIG. 2 is a fragmentary schematic view of the control system shown in FIG. 1 in modified form.

DESCRIPTION AND OPERATION

Referring to FIG. 1 of the drawing, the apparatus, which for illustrative purposes can be considered as being installed on a tug boat, comprises a propeller 1 fixed to a shaft 2 which is rotatably driven by any suitable means such as a reduction gear device 3, for example. The direction of rotation of shaft 2 and, therefore, the propeller 1 is determined in a manner to be hereinafter described, by engagement of either a normally disengaged ahead clutch 4 or a normally disengaged astern clutch 5 operably disposed between the gear device 3 and said shaft.

The apparatus, as shown in FIG. 1, further comprises an operator's controller 6 having an operating handle 7 which is operable out of a neutral position, as shown and indicated N in the drawing, in a clockwise, or forward direction indicated by an arrow F for effecting forward or ahead propulsion of the tug boat. The handle 7 is also operable out of position N in a counterclockwise or reverse direction indicated by an arrow R for effecting or astern propulsion of the boat. The controller 6 is connected to a source of compressed air or fluid under pressure shown in the form of a pipe 8 which is charged at a normally constant preselected pressure such as 80 p.s.i., for example.

A control valve device 9, which may be of any suitable type such as a spool type valve, for example, is provided for alternatively communicating a pipe 10 to one or the other of two pipes 11 and 12 connecting to the ahead and astern clutches 4 and 5 via quick release valve devices 13 and 14 interposed in said pipes 11 and 12, respectively. The control valve device 9 comprises a conventional spool valve member (not shown) having pressure areas at each end thereof and being biased to a central neutral position in which communication between pipe 10 and both pipes 11 and 12 is cut off. Predominating fluid pressure acting on the pressure area at one end of the spool valve, the right-hand end, for example, causes said spool valve to be shifted in the opposite direction or to the left for setting the control valve device 9 in what may be called a forward position in which pipe 10 is communicated with pipe 11 connecting to the ahead clutch 4, and pipe 12 is vented to atmosphere via a vent port 15. Conversely, predominating fluid pressure acting on the pressure area at the opposite or left-hand end of the spool valve causes said spool valve to be shifted to the right for setting said control valve device in a reverse position in which pipe 10 is communicated with pipe 12 connecting to the astern clutch 5, and pipe 11 is vented to atmosphere via a vent port 16.

When the handle 7 of the controller 6 is moved in the direction F to a start position indicated F' in the drawing, supply pipe 8 is communicated with a pipe 17 via which fluid pressure is supplied for operating control valve device 9 to its forward position. Movement of the handle 7 in the direction R to a start position indicated R' in the drawing effects communication of supply pipe 8 with a pipe 18 via which fluid pressure is supplied for operating the control valve device 9 to its reverse position. A relay valve device 19 is interposed between pipe 17 and a pipe 20 connected to the right-hand end of control valve device 9, said relay valve device normally occupying an open position in which pipe 17 is in communication with pipe 20. A relay valve device 21 is similarly interposed between pipe 18 and a pipe 22 connected to the left-hand end of control valve device 9 and functions similarly to relay valve device 19 in maintaining communications between pipes 18 and 22.

For a purpose to be hereinafter disclosed, pipe 11 is connected via a pipe 23 to a branch pipe 24 which, in turn interconnects a pressure volume 25 and a pressure chamber 26 of the relay valve device 21. A one-way check valve 27 and a choke 28, in parallel relation to each other, are interposed in pipe 23, in said check valve permitting one-way flow from pipe 11 to branch pipe 24, while said choke provides a restricted bypass of the check valve. Pipe 12 is connected via pipe 29 to a branch pipe 30 which, in turn, interconnects a pressure volume 31 and a pressure chamber 32 of the relay valve device 19. A one way check valve 33 and a choke 34 are interposed in pipe 29 in similar fashion as the check valve 27 and choke 28 in pipe 23.

If the handle 7 of the controller 6 is moved in the direction F past the start position F' and into a low speed range between said position F' at its lower limit and a position F" at its upper limit, a graduated fluid pressure speed control impulse, such as from 0 to 20 p.s.i., for example, is obtainable, the degree of such speed control impulse being determined by the extent to which said handle is moved into said low speed range. A similar low speed control impulse is obtainable on the reverse side of the controller 6 by moving the handle 7 past the start position R' into a low speed range between said position R' at its lower limit and a position R" at its upper limit.

Movement of the handle 7 into one of the low speed ranges, either forward or reverse, causes a fluid pressure speed control impulse, commensurate with the extent to which said handle IS moved into said range, to be transmitted via a pipe 35 to a control pressure chamber 36 of an analog interface valve device 37. The interface valve device 37 may be of any suitable type such as that disclosed in a copending application of Clifford W. Allen Ser. No. 22,562, filed Mar. 25, 1970, and assigned to the assignee of the present invention, said interface valve device 37 being connected to a source of fluid at a relatively high pressure on the order of 125 p.s.i. for example, which is shown in the drawing in the form of a pipe 38. If desired, the fluid under pressure supplied via pipe 38 may originate from the same source as that supplied via pipe 8, that is, the two pipes, though not shown as such, may be connected to each other. If it is desired to supply fluid to the controller 6 at a pressure lower than that in pipe 38, a reducing valve (not shown) can be interposed in pipe 8 ahead of the controller 6. The interface valve device 37 is conditioned to operably respond to a minimum effective pressure such as 3 p.s.i., for example, in control chamber 36. Thus, movement of the handle 7 into the low speed range sufficiently to transmit a control impulse of at least 3 p.s.i. pr greater causes the analog valve device 37 to be operated from a closed position to an open position in which a branch pipe 39 connected to pipe 38 is placed in communication with a pipe 40 connecting with a control chamber 41 of an analog type relay valve device 42.

The analog relay valve device 42 is interposed between pipes 10 and 40 and is also connected to a branch pipe 43 leading from pipe 38. Relay valve device 42, in this case is set to operate on a 1 to 1 ratio and functions in conventional manner to provide a high capacity supply of fluid (relative to that supplied to control chamber 41 via the interface valve device 37) at a pressure equivalent to that of control fluid in said control chamber. If desired, a flow-regulating valve device, such as a needle type valve device 44, may be interposed in pipe 10 for further adjustment of flow capacity through said pipe. Since the interface valve device 37, as above noted, is also an analog device, the degree of fluid pressure delivered by said interface valve device to the control chamber 41 of the high capacity relay valve device 42 is determined by the effectiveness of control pressure in control chamber 36, said effectiveness of pressure in said latter control chamber being determined, as above explained, partly by the amount of movement of handle 7 into one of the graduated control signal ranges of controller 6 and partly by other influences to be presently disclosed.

According to the invention, a speed-sensing device or speed sensor 45 is provided for detecting any change in the speed of propeller 1 after said propeller has been set in motion by movement of the handle 7 to a selected position. The speed sensor 45 may be of any suitable type, but preferably of the fluid operable type driven from the shaft 2 by a connecting belt 46. The speed sensor 45, to which a source of fluid under pressure, shown in the drawing as a pipe 47 (which also, if desired, may be connected to the source represented by pipe 8), is connected, functions in conventional manner for transmitting a fluid pressure impulse or signal, via a pipe 48, at a degree commensurate with the speed of shaft 2. Any change in the speed of shaft 2, therefore, is reflected in the fluid pressure signal or, in other words, the degree of said signal varies accordingly.

Also in accordance with the invention, a relay valve device 49 is interposed in pipe 48 and is normally disposed in an open position in which communication through said pipe is open, said valve device being operable, responsively to a predetermined degree of fluid pressure supplied to a pressure chamber 50 therein, to a closed position in which said communication through said pipe is interrupted. Pressure chamber 50 of the relay valve device 49 is connected to pipe 35 via branch pipe 51 and is therefore subject to the control pressure supplied to the analog valve device 37 when handle 7 of the controller 6 is operated past either of the start positions F' or R'.

For a purpose to be hereinafter explained, the relay valve device 49 is operable to its closed position responsively to fluid in chamber 50 at a pressure of 20 p.s.i. or more, it being noted that 20 p.s.i. corresponds to the pressure attained in pipe 35 when handle 7 is operated to one or the other of the positions F" and R" at the maximum or upper pressure levels of the low pressure ranges, respectively. With valve device 49 in its closed position, any signal transmitted by the speed sensor 45 is intercepted and, therefore, ineffective.

In operation, assuming it is desired to go in a forward direction, the handle 7 is first operated to F' position for starting the engine and at the same time charging pipe 17 with maximum supply pressure from supply pipe 8. Fluid under pressure in pipe 17 flows through the normally open relay valve device 19 to pipe 20 and to the right side of control valve device 9 for operating the spool valve member therein to its forward position in which, as above noted, pipe 10 is communicated with pipe 11.

If the tug boat is to be used for docking operation, the handle 7, after the engine is started and control valve device 9 is set in its forward position, is moved past position F' to a selected position in the low speed range, above described, so that pipe 35, and therefore, chamber 36 of the interface valve device 37 are charged with fluid at a pressure determined by the extent to which said handle has been moved into said low speed range. Since a minimum of 3 p.s.i. is necessary for operating the interface valve device 37, it will be assumed that the preselected pressure established in pipe 35 and control chamber 36 is over 3 p.s.i. and perhaps on the order of 10 p.s.i for example.

By its nature of operation, which is well known to those skilled in the art, the interface valve device 37 responds to the relatively low pressure in control chamber 36 to be initially operated to a fully open disposition and cause fluid at full pressure to be delivered from supply pipe 38 and branch pipe 39 to pipe 40 and, therefore, to control chamber 41 of the analog relay valve device 42. As above noted, since interface valve device 37 is characteristically a low flow capacity device, the purpose of relay valve device 42, which, as herein used, may be a 1 to 1 device (ratio of control pressure to delivered pressure), is to provide an increased flow capacity of fluid under pressure from pipe 38 and branch pipe 43 to pipe 10 and consequently to the ahead clutch 4 via needle valve device 44, control valve device 9, pipe 11, and quick release valve 13. Since the fluid initially delivered to the normally disengaged ahead clutch 4 is at full pressure, full engagement of said clutch is effected to start rotation of shaft 2 and propeller 1.

Rotation of shaft 2, through belt 46, actuates the speed sensor 45 which, in turn, transmits a control signal as feeding pressure to the interface valve device 37 via the open relay valve device 49. Initial feedback pressure and, therefore, the control signal transmitted to the interface valve device 37 at this point is of a degree sufficient for overcoming the control pressure in chamber 36 to thereby cause said interface valve device to be momentarily operated to its closed position thus cutting off further supply of high pressure to the relay valve device 42 and allowing the pressure in control chamber 41 of said relay valve device to be vented to atmosphere via pipe 40 and a vent 52 in the interface valve device.

With pressure exhausted from chamber 41 of the relay valve device 42, said relay valve device operates to a closed position in which supply of fluid pressure through said relay valve is cut off and fluid pressure in pipes 10 and 11 vents to atmosphere via a vent 53 in said relay valve device. Pressure reduction in pipes 10 and 11 causes a pressure differential in the quick release valve device 13 through which, in conventional manner, actuating pressure in the clutch 4 is practically immediately released to effect substantially instantaneous disengagement of said clutch. Disengagement of clutch 4 causes the speed of propeller 1 to slow down. Decreasing speed of propeller 1 is registered in the speed sensor 45 which consequently transmits a correspondingly reduced feedback signal to the interface valve device 37. The interface valve device 37, in response to the combined opposing effects of the reduced feedback pressure and the initially established control fluid pressure in control chamber 36, which now prevails, (said control fluid pressure and said feedback pressure eventually attaining a stabilized proportional relationship) is again operated to its open position to restore, in the manner above described, fluid to the clutch 4 at a proportionally reduced pressure according to said stabilized relationship of said control chamber pressure to the reduced feedback pressure. The construction of the interface valve device 37 includes a valve member (not shown) interposed in the communication between pipes 39 and 40, said valve member being operable for proportionally metering delivery of fluid from pipe 39 to pipe 40 at a pressure corresponding to the proportional relationship between the pressure in control chamber 36 and feedback pressure from the speed sensor 45. The reduced pressure resulting from feedback adjustment and delivered to the clutch 4 is not sufficient for effecting full engagement of said clutch, so that a certain degree of clutch slippage now occurs to cause the propeller 1 to assume a correspondingly slower speed which is maintained until such time as a further adjustment of pressure delivered to said clutch is effected either as a result of any variance in speed of propeller 1 or by a change in the position of handle 7 for changing the degree of control pressure in control chamber 36 of the interface device 37.

As was hereinbefore noted, as long as control pressure in pipe 35 and, therefore, in chamber 50 of the relay valve device 49 is less than 20 p.s.i., said relay valve device remains in an open disposition, but if handle 7 of the controller 6 is moved to a position beyond F" (or R"), that is, in a high speed range, the pressure of fluid delivered to said pipe and chamber exceeds 20 p.s.i. and causes said relay valve device to be operated to a closed position. In the closed position of relay valve device 49, communication through pipe 48 to the interface valve device 37 is closed to thereby intercept and render ineffective any feedback signals from the speed sensor 45, and any feedback pressure prevailing in said interface valve device is vented via a vent 54 in said relay valve device. As long as relay valve device 45 is in its closed disposition, speed of the propeller 1 is controlled solely by the position of the handle 7 of the controller 6 and the degree of control pressure established thereby, as will be more fully explained. Pipe 35 is connected via a branch pipe 55 to a fluid pressure operable engine throttle and governor 56 which controls the speed of an engine 57 according to the degree of fluid pressure prevailing in said pipes 35 and 55 as determined by the position of controller handle 7. A one-way check valve 58 is interposed in branch pipe 55 with a choke 59 also connected to pipe 55 in parallel relation to said check valve. The check valve 58 and choke 59 are arranged so as to permit flow of fluid under pressure from pipe 55 to the engine throttle at a rate according to the flow capacity of choke 59 while permitting unrestricted flow in a reverse direction via the one-way check valve 58. This arrangement, therefore, provides gradual acceleration of engine speed and uninhibited or rapid deceleration, which is a desirable characteristics of marine engine speed control.

The governor of the engine throttle 56 is pre-set to maintain the engine 57 at idling speed as long as the controller handle 7 is positioned in one of the low speed ranges. Thus, the engine throttle governor 56, in this case, is pre-set at 20 p.s.i. which corresponds to the maximum fluid pressure attainable in the low speed ranges, that is, at positions F" and R" of handle 7. If handle 7 is moved beyond either of the positions F" or R", fluid pressure established in pipe 35 and, therefore, in pipe 55 exceeds 20 p.s.i. by an amount corresponding to the amount said handle is moved beyond said positions. In response to such pressure in excess of 20 p.s.i., the engine throttle, in conventional manner, effects engine speed corresponding to the pressure thus established.

It should be noted that the 20 p.s.i. setting of the engine throttle governor also coincides with the 20 p.s.i. minimum pressure (which is established in pipe 35 and therefore chamber 50 of relay valve device 49 by movement of handle 7 to either of the positions F" and R") necessary for operating said relay valve device to its said closed position for intercepting any feedback signal from the speed sensor 45 to the interface valve device 37. With the effect of any feedback signal thus cut off from the interface valve device 37, control fluid from pipe 35 acting in control chamber 36 of said interface valve device at a pressure of at least 20 p.s.i. is effective for causing the interface valve device to establish delivery of pressure from pipe 38 to clutch 4, as above described, at a degree sufficient for causing full engagement of said clutch. With clutch 4 in full engagement and clutch slip control thus eliminated, speed of the shaft 2 and propeller 1 is determined solely by engine speed as controlled by the engine throttle.

It should be apparent that operation of the astern clutch 5 is similar to the sequence of operation as above described for operation of the ahead clutch 4, except that handle 7 is moved in the direction R to effect pressurization of pipe 18 and, therefore, supply of such fluid pressure via relay valve device 21 and pipe 22 to the left end of the spool valve member (not shown) in the control valve device 9 to effect movement thereof in a right-hand direction, as viewed in the drawing, for communicating pipe 10 with pipe 12 leading to the astern clutch 5. The remainder of the operation is similar to that described in connection with the ahead clutch 4.

The purpose of the volume 25, check valve 27, choke 28 and volume 31, check valve 33, choke 34 arrangements associated with the relay valve devices 21 and 19 respectively, will now be set forth.

Each of the relay valve devices 21 and 19 includes biasing means (not shown) for retaining the valve devices in a normally open disposition whereby fluid under pressure may flow therethrough from pipe 18 to pipe 22 and from pipe 17 to pipe 20, respectively. The biasing means, however, is calibrated such that the fluid in either chamber 26 or chamber 32, at a pressure exceeding 3 p.s.i., is effective for operating the respective relay valve devices 21 or 19 to a closed disposition in which flow of fluid under pressure therethrough is blocked. Thus, as was above described, when the handle 7 is operated to a position in direction F, supply of fluid under pressure to the ahead clutch 4 is effected via pipe 11. Since, as was above noted, a control pressure of at least 3 p.s.i. is required to operate the interface valve device 37 to effect supply of actuating pressure to either of the clutches 4 or 5, the pressure of fluid thus delivered via pipe 11 is also at least 3 p.s.i. or higher. Fluid under pressure prevailing in pipe 11 also flows via pipe 23, unrestrictedly through check valve 27, at a restricted rate via choke 28, and via pipe 24 to volume 25 and control chamber 26 of relay valve device 21, which, in response to such fluid pressure in said control chamber, is operated to its closed disposition to block communication therethrough between pipes 18 and 22.

With relay valve device 21 in its closed disposition, if handle 7 is suddenly shifted from its forward position to a reverse position in direction R, control fluid pressure in pipes 17 and 20 acting on the right side of control valve device 9 is exhausted via a vent 60 in the controller 6, and at the same time control fluid, at a pressure determined by the extent of movement of said handle in direction R, is established in pipe 18. Since relay valve device 21 is now closed, fluid under pressure in pipe 18 is blocked from flowing, via pipe 22, to the left side of control valve 9, and since fluid pressure previously acting on the right side is now exhausted, the spool member (not shown) therein returns to its neutral position in which both pipes 11 and 12 are vented to atmosphere via vents 16 and 15, respectively, and fluid pressure in clutch 4 is thus released, as above described, via quick release valve 13 to effect disengagement of said clutch. With supply of fluid under pressure to pipe 11 now terminated, and with said pipe now vented to atmosphere via vent 16 in control valve device 9, fluid pressure in volume 25 and in control chamber 26 of relay valve 21 is also vented to atmosphere via said vent, but at a restricted rate because the one-way check valve 27 prevents reverse flow therethrough so that such venting of said volume and said control chamber must occur through choke 28. The time interval necessary for exhausting volume 25 and control chamber 26, therefore, is determined, by the capacity of said volume and the flow rate capacity of choke 28, said time interval being on the order of 6 to 8 seconds, or some other time interval that will provide sufficient time for preventing abrupt erratic reversal of the shaft 2 and propeller 1 and possible damage thereto as well as to the gear box 3.

With control chamber 26 vented, after a certain time interval, the relay valve device 21 is restored to its normally open position to allow fluid pressure established in pipe 18 to flow to the left side of control valve device 9 for setting the spool valve member of said control valve device in its referse position in which fluid pressure is supplied via pipe 12 for actuating the astern clutch 5 and controlling the operation thereof, in a manner similar to that described in connection with actuation of clutch 4.

Since the tug boat is operated primarily in a forward direction during docking operations, with the reverse used only for moving the tug boat itself, it may be desirable to modify the clutch control apparatus such that slip control of the clutch occurs only in the forward direction of travel, that is, only with the ahead clutch 4. Such modification is shown in FIG. 2 of the drawing.

A branch pipe 61 having a double check valve device 62 interposed therein connects pipe 22 (leading to the left side of control valve device 9) to pipe 35, said double check valve device having pipe 22 connected to one inlet 63 and pipe 35 connected to another inlet 64, and an outlet 65 connected to the control chamber 50 of relay valve device 49.

When handle 7 is operated to a forward position in direction F, control pressure in pipe 35, entering through inlet 64, causes the double check valve device 62 to be moved to a first position in which said pipe 35 is communicated with chamber 50 of the relay valve device 49, and the apparatus functions, as above described, to effect clutch control in both the low speed range and high speed range. If the handle 7, however, is moved into a reverse position in direction R, pipe 22 is charged with fluid pressure, in the manner hereinbefore described, for setting the spool valve member of control valve device 9 in its reverse position. At the same time, such fluid pressure established in pipe 22 also flows via pipe 61 to the inlet 63 of the double check valve 62 for causing said double check valve to assume a second position in which pipe 61 is communicated with chamber 50 of relay valve device 49. Since fluid pressure in pipe 61 is the same as that in pipe 22, and since, as was previously noted, pressure in pipe 22, when charged, is the same as that of the source in pipe 8, which was assumed to be 80 p.s.i., said pressure thus prevailing in control chamber 50 is sufficient for operating the relay valve device 49 to its closed position, thereby cutting off any feedback pressure signals from the speed sensor 45. Thus, slip control operation is eliminated during reverse travel of the tug boat.

Having now described the invention, what we claim as new and desire to secure by Letters Patent, is:

1. A slip clutch control system for controlling the speed of rotation of a marine engine propeller, said system comprising:
   a. a rotatable shaft having the propeller mounted thereon for rotation therewith;
   b. first means for rotatably driving said shaft;
   c. second means for establishing a first control impulse of a preselected degree;
   d. normally disengaged clutch means interposed between said first means and said shaft, said clutch means being operable to various degrees of engagement for transmitting driving force from said first means to said shaft in accordance with the degree of engagement of the clutch means;
   e. third means for effecting engagement of said clutch means;
   f. fourth means operable responsively to the rate of rotation of said shaft to produce a second control impulse according to the existing rate of rotation, said third means being operable responsively to the combined effects of said first and said second control impulses for effecting engagement of said clutch means and therefore transmission of driving force to said shaft commensurate with said combined effects of the control impulses; and
   g. fifth means interposed between said third and fourth means and operable responsively to said first control impulse at a degree exceeding a certain value for interrupting said second control impulse, said third means being operable responsively to said first control impulse only, upon interruption of said second control impulse, for effecting full engagement of said clutch means.

2. A slip clutch control system for controlling the speed of rotation of a marine engine propeller, said system comprising:
   a. a rotatable shaft having the propeller mounted thereon for rotation therewith;
   b. first disengaged for rotatably driving said shaft;
   c. normally disengage clutch means interposed between said first means and said shaft, said clutch means being operable to various degrees of engagement for transmitting driving force from said first means to said shaft in accordance with the degree of engagement of the clutch means;
   d. second means for effecting engagement of said clutch means;
   e. a source of fluid under pressure;
   f. an operator's controller connected to said source of fluid under pressure and being manually operable to a plurality of positions for producing a first fluid pressure control impulse at a degree corresponding to the position to which said controller is operated;
   g. first pipe means via which said first control impulse is transmitted to said second means; and
   h. third means operable responsively to the rate of rotation of said shaft to produce a second control impulse according to the existing rate of rotation, said second means being operable responsively to the combined effects of said first and second control impulses for effecting engagement of said clutch means and therefore transmission of driving force to said shaft commensurate with said combined effects of the control impulses.

3. A slip clutch control system, as defined in claim 2, wherein:
   a. said operator's controller is operable from a neutral position to various forward positions and various reverse positions;
   b. said clutch means comprises ahead and astern clutches for effecting directional rotation of said shaft corresponding to the forward or reverse position of the operator's controller; and
   c. said third means includes:
      i. second pipe means;
      ii. interface valve means responsive to said combined effects of said first and said second control impulses for effecting supply of actuating fluid pressure via said second pipe means from said source to one of said ahead and astern clutches;
      iii. a fluid pressure responsive control valve device interposed in said second pipe means and normally having a neutral position in which both said clutches are vented to atmosphere for effecting disengagement thereof, said control valve device being subjectable alternatively to fluid pressure on opposite sides thereof and operable responsive thereto a forward position and a reverse position for directing said actuating fluid pressure to said ahead clutch and to said astern clutch, respectively, and iv. third pipe means connecting said control valve device to said operator's controller and via which fluid pressure is supplied from said source to one or the other side of said control valve device for effecting operation thereof to one of said forward and reverse positions in accordance with the position of said controller.

4. A slip clutch control system, as defined in claim 3, wherein said interface valve means comprises a fluidic analog valve device, said first and second control impulses being low pressure control impulses acting in opposing relation for establishing a resultant low pressure differential to which said analog valve device responds for effecting said supply of actuating fluid at a relatively high degree of pressure proportional to said resultant pressure differential.

5. A slip clutch control system, as defined in claim 4, wherein:
   a. said fluidic analog interface valve device is operable responsively to said resultant low pressure differential for producing a relatively high pressure control impulse; and
   b. said third means further comprises an analog relay valve device interposed in said second pipe means and operable responsively to said high pressure control impulse for amplifying the flow of actuating fluid to said clutch means via said second pipe means.

6. A slip clutch control system, as defined in claim 3, wherein:
   a. said third pipe means comprises:
      i. first branch pipe means connecting said operator's controller to said one side of said control valve device for transmitting fluid pressure to said one side and effecting operation of the control valve device to its said forward position upon operation of said controller to one of its said forward positions, and
      ii. second branch pipe means connecting said operator's controller to said other side of said control valve device for transmitting fluid pressure to said other side and effecting operation of the control valve device to its said reverse position upon operation of said controller to one of its said reverse positions; and
   b. said slip clutch control system is further characterized by:
      i. relay valve means interposed in each of said first and said second branch pipe means, each of said relay valve means being normally biased to an open position in which communication through the respective branch pipe means is open, and each having a control chamber subjectable to actuating fluid pressure supplied to said clutches, the control chamber of the relay valve means in said second branch pipe means being subject to actuating fluid, at a pressure exceeding a certain minimum degree, supplied to the ahead clutch and operable responsively thereto to a closed position in which communication through said second branch pipe is closed as long as supply of actuating fluid pressure to said ahead clutch is in effect, and vice versa.

7. A slip clutch control system, as defined in claim 6, wherein:
   a. fluid pressure in said control chambers is vented via said control valve device upon operation of said control valve device to its said neutral position; and
   b. said slip clutch control system is further characterized by respective means for delaying venting of said control chambers for a predetermined time interval.

8. A slip clutch control system, as defined in claim 6, wherein:
   a. fluid pressure supplied via said first and second branch pipe means from said source to said control valve device normally exceeds a certain value; and
   b. said slip clutch control system is further characterized by:

i. fourth pipe means via which said second control impulse is transmitted from said fourth means to said interface valve means,
   ii. a relay valve device normally biased to an open position in which communication through said fourth pipe means is open and having a pressure chamber, said relay valve device being operable responsively to fluid in said pressure chamber, at a pressure exceeding said certain value, to a closed position in which communication through said fourth pipe means is closed,
   iii. a double check valve device having a first inlet connected to said first pipe means, a second inlet connected to one of said first and second branch pipe means, and an outlet connected to said pressure chamber of said relay valve device in said fourth pipe means, said double check valve device being operable responsively to fluid pressure in said one of said first and second branch pipe means or to fluid in said first pipe means at a pressure exceeding said certain value for supplying such fluid pressure, via said outlet, to said pressure chamber for effecting consequent operation of said relay valve device to its said closed position.

9. A slip clutch control system, as defined in claim 8, wherein said second inlet of said double check valve device is connected to said second branch pipe means.

10. A slip clutch control system for controlling the speed of rotation of a marine engine propeller, said system comprising:
   a. a rotatable shaft having the propeller mounted thereon for rotation therewith;
   b. driving means providing a driving force commensurate with the operating speed thereof for driving said shaft and including governor means for restricting the speed of said driving means at a substantially constant rate during operation thereof in a preselected low-speed range;
   c. a source of fluid under pressure;
   d. operator's means connected to said source of fluid under pressure and being selectively manually operable to a plurality of positions in a low-speed range and in a high-speed range for effecting a first fluid pressure control impulse at a degree corresponding to the position to which said operator's means is operated;
   e. clutch means normally disengaged and interposed between said driving means and said shaft, said clutch means being operable to various degrees of engagement for transmitting driving force from said driving means to said shaft in accordance with the degree of engagement of the clutch means;
   f. actuating means for effecting engagement of said clutch means;
   g. first pipe means via which said first control impulse is transmitted simultaneously from said source to said actuating means and to said driving means, said driving means being operable at said constant rate of speed in response to such first control impulse resulting from operation of said operator's means to a position in said low-speed range for providing a driving force of a predetermined fixed degree irrespective of any variance in the degree of said first control impulse, and being operable at a variable rate of speed in response to such first control impulse resulting from operation of said operator's means to a position in said high-speed range to provide a driving force commensurate with the degree of said first control impulse;
   h. speed responsive means operable responsively to the rate of rotation of said shaft to produce a second control impulse according to the existing rate of rotation, said actuating means being operable responsively to the combined effects of said first and said second control impulses for effecting engagement of said clutch means to a degree commensurate with said combined effects of the control impulses; and
   i. interrupting means interposed between said actuating means and said speed responsive means and operable responsively to said first control impulse at a degree exceeding a certain value resulting from operation of the operator's means to a position in said high-speed range, for cutting out the effect of said second control impulse and rendering said actuating means responsive to said first control impulse only, and consequently effecting full engagement of said clutch means, j. said governor means and said interrupting means both being operable responsively to said first control impulse at an identical degree, that is, at said degree exceeding a certain value, for effecting operation of said driving means at said variable rate of speed and full engagement of said clutch means simultaneously.

* * * * *

UNITED STATES PATENT OFFICE
CERTIFICATE OF CORRECTION

Patent No. 3,653,476      Dated April 4, 1972

Inventor(s) Clifford W. Allen & Richard F. Wilson

It is certified that error appears in the above-identified patent and that said Letters Patent are hereby corrected as shown below:

Column 2, line 16, after "effecting" insert --reverse--

Column 8, line 28, "disengaged" should be --means--

Column 9, line 1, after "thereto" insert --to--

Signed and sealed this 1st day of May 1973.

(SEAL)
Attest:

EDWARD M. FLETCHER, JR.       ROBERT GOTTSCHALK
Attesting Officer      Commissioner of Patents